Nov. 1, 1927.  
D. D. VANN  
1,647,821  
PIVOT JOINT  
Filed June 8, 1926

INVENTOR.  
D. D. Vann.  
BY J. Edward Maybee  
ATTY.

Patented Nov. 1, 1927.

1,647,821

UNITED STATES PATENT OFFICE.

DAVID D. VANN, OF ST. THOMAS, ONTARIO, CANADA.

PIVOT JOINT.

Application filed June 8, 1926. Serial No. 114,467.

This invention relates to pivot joints particularly adapted for the steering arm joints of motor vehicles, and my object is to provide means for reducing wear at these joints and for taking up any lost motion due to wear, and thus to prevent the objectionable horizontal shaking of the vehicle while in operation at low speed, which generally results from looseness in the steering arm joints.

Such joints commonly comprise a head on the arm, which fits between jaws formed on the rod which connects the steering arms and a bolt passing through the head and the jaws. I provide, in addition, at least two washers at each end of the bolt outside the jaws, each washer being formed with an integral arm substantially in the same plane as the washer. The jaw member and the arm each carries a bolt parallel to the pivot bolt aforesaid, and one washer of each pair is connected by its arm to one bolt and the other washer of each pair to the other bolt.

Preferably a plurality of washers are employed in each set at each end of the bearing. The pivot bolt is provided at one end with a coil spring whereby spring pressure is exerted to take up all lost motion parallel to the axis of the bolt.

The invention is illustrated in the accompanying drawings in which

Figure 1:
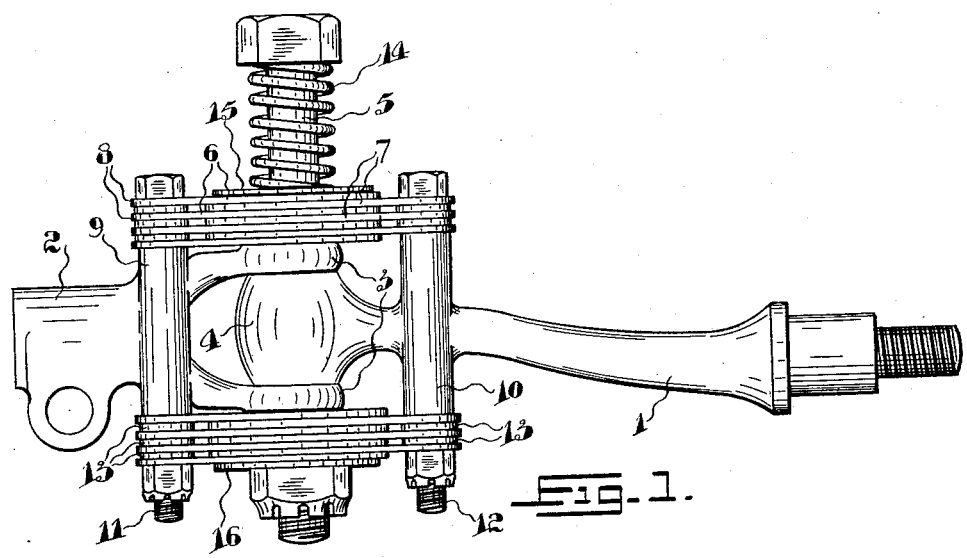
Figure 2:
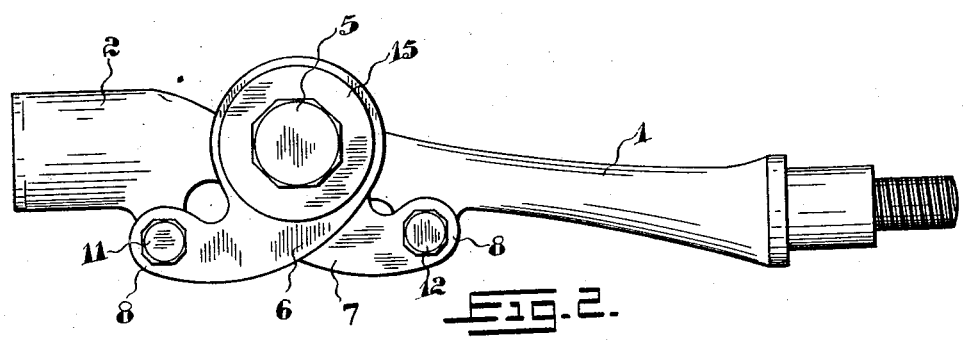

Fig. 1 is a side elevation of a joint constructed in accordance with my invention; and Fig. 2 a plan view of the same.

In the drawings like numerals of reference indicate corresponding parts in the different figures.

1 is a steering arm, which will be connected in the usual manner to the sleeve of one of the stub axles of the vehicle. 2 is the connection usually secured to the end of the transverse connecting rod, through the medium of which simultaneous operation of both stub axles of the vehicle is effected. This connection 2 is formed with jaws 3, between which is fitted the head 4 of the steering arm 1. Through the jaws and the head extends a pivot bolt 5. Outside the jaws on the bolt 5 are positioned at each end a plurality of washers 6 and 7, the washers 6 being alternated with the washers 7. Each washer has an arm 8 formed integral therewith, each arm having a hole formed therein. The washers are all exactly alike and the arm 8 of each washer is formed substantially tangential to the washer and lies in the same plane. All washers therefore are interchangeable.

On the connection 2 is formed a vertical sleeve 9, and on the arm 1 a vertical sleeve 10. These sleeves are set to one side and do not pass through the connections. Through the sleeve 9 passes a bolt 11 and through the sleeve 10 a bolt 12. The bolt 11 passes through the holes in the arms 8 of the washers 6, while the bolt 12 passes through the holes in the arms 8 of the washers 7. Spacing washers 13 are positioned on the bolts between the arms 8.

One end of the pivot bolt 5 is extended sufficient so that a coil spring 14 may be positioned thereon engaging either the nut or the head of the bolt, and preferably bearing against the washer 15 bearing against the outside arm-carrying washer at that side of the jaws. A washer 16 is fitted between the nut or head of the bolt, as the case may be, and an adjacent arm-carrying washer at the other side of the jaws. The spring maintains all the parts in proper contact and takes up any lost motion which may occur.

With this arrangement not only are the horizontal bearing surfaces of the joint greatly increased, which results in reduced wear, but the axial length of the bearing is very materially increased, thus overcoming the excessive wear which formerly took place in the head and jaws due to shortness of the vertical bearing. Owing to the offsetting of the sleeves 9 and 10 and the tangential position of the arms 8 relative to the washers, the arms 8 overlap when the parts are in normal working position and the horizontal bearing is materially extended away from the journal.

It is found with this construction that the objectionable horizontal shaking of the vehicle, or "shimmying" as it is termed, is prevented.

What I claim is:

In a joint, the combination of a member formed with jaws; a member formed with a head fitting between the jaws; a pivot bolt passing through the head and jaws; a plurality of similar washers on each end of the pivot bolt outside the jaws; a bolt carried by each of the aforesaid members parallel to the pivot bolt and offset relative to the member carrying it; and an arm on each washer substantially tangential to the washer, at least one washer at each side of the jaws being connected by its arm with one bolt and another washer at each side with the other bolt.

Signed at London, Canada, this 18th day of May, 1926.

DAVID D. VANN.